United States Patent [19]

Saxena

[11] Patent Number: 5,734,664
[45] Date of Patent: Mar. 31, 1998

[54] METHOD AND APPARATUS TO EFFICIENTLY STORE ERROR CODES

[75] Inventor: Nirmal R. Saxena, San Jose, Calif.

[73] Assignee: Fujitsu Limited, Kawasaki, Japan

[21] Appl. No.: 494,150

[22] Filed: Jun. 23, 1995

[51] Int. Cl.[6] .................................................. G06F 11/10
[52] U.S. Cl. ................................... 371/40.4; 371/40.1
[58] Field of Search .......................... 371/40.1, 40.4, 371/40.3

[56] References Cited

U.S. PATENT DOCUMENTS

| | | | |
|---|---|---|---|
| 5,206,855 | 4/1993 | Gruender, Jr. et al. | 371/40.1 |
| 5,450,423 | 9/1995 | Iwasaki et al. | 371/40.1 |
| 5,490,155 | 2/1996 | Abdoo et al. | 371/40.1 |

FOREIGN PATENT DOCUMENTS

| | | | |
|---|---|---|---|
| 0 491 544 A3 | 6/1992 | European Pat. Off. | G06F 11/10 |
| 4-290144 | 10/1992 | Japan . | |

OTHER PUBLICATIONS

Bossen, "b–Adjacent Error Correction", IBM J. Res. Develop., Jul. 19, 1970, pp. 402–408.
Rosenberg, "Dictionary of Computers, Information Processing & Telecommunications" 2nd ed., copyright Dec. 1987, John Wiley & Sons, pub., pp. 214, 215.
Dunning, L.A., "SEC–BED–DED Codes for Error Control in Byte–Organized Memory Systems", *IEEE Transactions on Computers*, vol. C–34, No. 6, Jun. 1985, pp. 557–562, New York, USA.
International Search Report to International Application No. PCT/US96/09682, issued Nov. 6, 1996.

*Primary Examiner*—Stephen M. Baker
*Attorney, Agent, or Firm*—Fenwick & West LLP

[57] ABSTRACT

Methods and apparati allow a more compact error correction code which corrects and detects one or more bit errors and detects a memory chip failure to be used for the detection and correction of errors. Rather than store data in groups of bits equal to the width of the memory chip, data is stored in groups of bits smaller than the width of a chip. An error correction code is used that detects the failure of a chip having the width of the group. Because the group is smaller than the width of the chip, a smaller error code may be used.

18 Claims, 2 Drawing Sheets

METHOD AND APPARATUS TO EFFICIENTLY STORE ERROR CODES

RELATED APPLICATIONS

The subject matter of this application is related to the following applications:

Application Ser. No. 08/488,816 entitled "Method and Apparatus for Detecting Duplicate Entries in a Look-Up Table" filed on Jun. 9, 1995 by Nirmal R. Saxena;

Application Ser. No. 08/488,941 entitled "Method, System and Apparatus for Efficiently Generating Binary Numbers for Testing Storage Devices" filed on Jun. 9, 1995 by Nirmal R. Saxena;

Application Ser. No. 08/488,615 entitled "Method and Apparatus for Detecting Memory Addressing Errors" filed on Jun. 9, 1995 by Nirmal R. Saxena;

Application Ser. No. 08/457,049 entitled "METHOD AND APPARATUS FOR ROTATING ACTIVE INSTRUCTIONS IN A PARALLEL DATA PROCESSOR" filed on Jun. 1, 1995 by Sunil Savkar, Michael C. Shebanow, Gene W. Shen, and Farhad Sajjadian;

Application Ser. No. 08/456,746 entitled "PROGRAMMABLE INSTRUCTION TRAP SYSTEM AND METHOD" filed on Jun. 1, 1995 by Sunil Savkar, Gene W. Shen, Farhad Sajjadian, and Michael C. Shebanow;

Application Ser. No. 08/388,602 entitled "INSTRUCTION FLOW CONTROL CIRCUIT FOR SUPERSCALER MICROPROCESSOR" filed on Feb. 14, 1995 by Takeshi Kitahara;

Application Ser. No. 08/388,389 entitled "ADDRESSING METHOD FOR EXECUTING LOAD INSTRUCTIONS OUT OF ORDER WITH RESPECT TO STORE INSTRUCTIONS" filed on Feb. 14, 1995 by Michael A. Simone and Michael C. Shebanow;

Application Ser. No. 08/388,606 entitled "METHOD AND APPARATUS FOR EFFICIENTLY WRITING RESULTS TO RENAMED REGISTERS" filed on Feb. 14, 1995 by DeForest W. Tovey, Michael C. Shebanow and John Gmuender;

Application Ser. No. 08/388,364 entitled "METHOD AND APPARATUS FOR COORDINATING THE USE OF PHYSICAL REGISTERS IN A MICROPROCESSOR" filed on Feb. 14, 1995 by DeForest W. Tovey, Michael C. Shebanow and John Gmuender;

Application Ser. No. 08/390,885 entitled "PROCESSOR STRUCTURE AND METHOD FOR TRACKING INSTRUCTION STATUS TO MAINTAIN PRECISE STATE" filed on Feb. 14, 1995 by Gene W. Shen, John Szeto, Niteen A. Patkar and Michael C. Shebanow;

Application Ser. No. 08/397,810 entitled "PARALLEL ACCESS MICRO-TLB TO SPEED UP ADDRESS TRANSLATION" filed on Mar. 3, 1995 by Chih-Wei David Chang, Kioumars Dawallu, Joel F. Boney, Ming-Ying Li and Jen-Hong Charles Chen;

Application Ser. No. 08/397,809 entitled "LOOKASIDE BUFFER FOR ADDRESS TRANSLATION IN A COMPUTER SYSTEM" filed on Mar. 3, 1995 by Leon Kuo-Liang Peng, Yolin Lih and Chih-Wei David Chang;

Application Ser. No. 08/397,893 entitled "RECLAMATION OF PROCESSOR RESOURCES IN A DATA PROCESSOR" filed on Mar. 3, 1995 by Michael C. Shebanow, Gene W. Shen, Ravi Swami, Niteen Patkar;

Application Ser. No. 08/397,891 entitled "METHOD AND APPARATUS FOR SELECTING INSTRUCTIONS FROM ONES READY TO EXECUTE" filed on Mar. 3, 1995 by Michael C. Shebanow, John Gmuender, Michael A. Simone, John R. F. S. Szeto, Takumi Maruyama and DeForest W. Tovey;

Application Ser. No. 08/397,911 entitled "HARDWARE SUPPORT FOR FAST SOFTWARE EMULATION OF UNIMPLEMENTED INSTRUCTIONS" filed on Mar. 3, 1995 by Shalesh Thusoo, Farhad Sajjadian, Jaspal Kohli, and Niteen Patkar;

Application Ser. No. 08/398,284 entitled "METHOD AND APPARATUS FOR ACCELERATING CONTROL TRANSFER RETURNS" filed on Mar. 3, 1995 by Akiro Katsuno, Sunil Savkar and Michael C. Shebanow;

Application Ser. No. 08/398,066 entitled "METHODS FOR UPDATING FETCH PROGRAM COUNTER" filed on Mar. 3, 1995 by Akira Katsuno, Niteen A. Patkar, Sunil Savkar and Michael C. Shebanow;

Application Ser. No. 08/397,910 entitled "METHOD AND APPARATUS FOR PRIORITIZING AND HANDLING ERRORS IN A COMPUTER SYSTEM" filed on Mar. 3, 1995 by Chih-Wei David Chang, Joel Fredrick Boney and Jaspal Kohli;

Application Ser. No. 08/398,151 entitled "METHOD AND APPARATUS FOR RAPID EXECUTION OF CONTROL TRANSFER INSTRUCTIONS" filed on Mar. 3, 1995 by Sunil W. Savkar;

Application Ser. No. 08/397,800 entitled "METHOD AND APPARATUS FOR GENERATING A ZERO BIT STATUS FLAG IN A MICROPROCESSOR" filed on Mar. 3, 1995 by Michael Simone;

Application Ser. No. 08/397,912 entitled "ECC PROTECTED MEMORY ORGANIZATION WITH PIPELINED READ-MODIFY-WRITE ACCESS" filed on Mar. 3, 1995 by Chien Chen and Yizhi Lu; and Application Ser. No. 08/398,299 entitled "PROCESSOR STRUCTURE AND METHOD FOR TRACKING INSTRUCTION STATUS TO MAINTAIN PRECISE STATE" filed on Mar. 3, 1995 by Chien Chen, John R. F. S. Szeto, Niteen A. Patkar, Michael C. Shebanow, Hideki Osone, Takumi Maruyama and Michael A. Simone;
each of the above applications are incorporated herein by reference in their entirety.

FIELD OF INVENTION

The present invention relates to digital storage systems, and more specifically to error correction and detection capabilities in an addressable, digital memory system.

BACKGROUND OF THE INVENTION

Digital storage systems such as memory systems utilize error correction and detection codes such as Hamming codes to detect and correct single or multiple bit errors. However, complete chip failures are common, and codes have been developed to detect chip failures in addition to the detection and correction of one or more bit failures. SEC-DED-SnED codes correct double bit errors, detect single bit errors and detect complete failure of an addressable memory device having a bit width of n bits.

For example, an SEC-DED-S4ED code, described below, allows single bit errors to be corrected, double bit errors to be detected, and complete single device failures to be detected where each device of several stores four bits in each addressable memory location. An SEC-DED-S8ED code allows single bit errors to be corrected, double bit errors to be detected, and complete chip failures to be detected where each chip of several stores eight bits in each addressable memory location. Several devices are-used where the "width" or number of bits of the data exceeds the "width" or number of bits in each addressable location of the device.

The SEC-DED-S4ED code performs its functions on 64 bits of databy the addition of only eight check bits, the additional bits containing the error correction and detection codes. The SEC-DED-S8ED code requires ten check bits to perform its function on the same 64 data bits, because the code must check more bits to detect complete device failure. Thus, the number of check bits is smaller for the same size data stored in devices having smaller widths. The problem of larger numbers of check bits required for larger memory devices is exacerbated by the fact that larger numbers of check bits may not fit in the device exactly, which can require additional storage space. For example, because many memory chips store data in eight bits widths, the addition of the ten check bits of the SEC-DED-S8ED code could require an additional sixteen bits of storage capacity to store the additional ten check bits, requiring twice the check bit storage overhead of the eight bits in the SEC-DED-S4ED code.

SUMMARY OF INVENTION

A method and apparatus used with a conventional computer system stores only m bits of data in each addressable storage device such as a RAM where the width of the device is greater than m. This arrangement allows the use of SEC-DED-SmED error correction code, or simply error codes, to perform error correction and detection functions in a storage system which utilizes addressable memory devices of widths greater than m bits. The resulting error code is smaller than the code which would otherwise be required if m was equal to the width of the addressable storage device, reducing the storage requirements for the error code. Alternatively, the remaining portion of the device width may be used to store other data. The other data may also use an error code without requiring the use of the larger error code required if m bits had occupied the entire width of the device.

DESCRIPTION OF A PREFERRED EMBODIMENT

According to the present invention, data for use in a conventional computer system is stored in addressable memory devices without utilizing the entire width of one or more devices error correcting code, referred to simply as and an error correcting code, referred to simply as error code, is used corresponding to a device width equal to the width of the device utilized. Although the present invention does not require the storage of multiple data words in each device, doing so allows the utilization of the entire storage device as described below.

Figure 1:
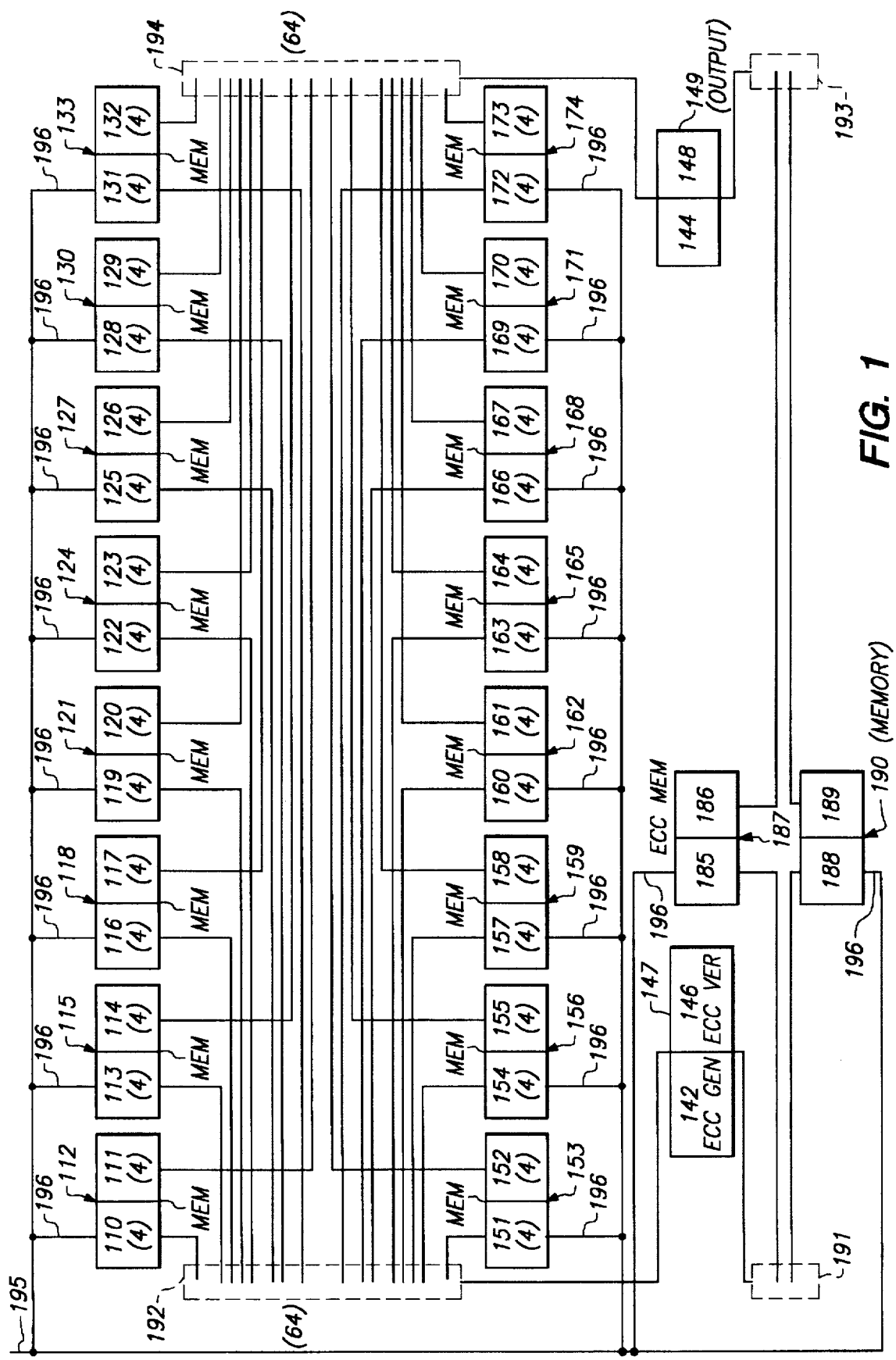
FIG. 1 is a block schematic diagram illustrating one embodiment of an apparatus which stores two 64-bit data words and their associated error codes according to one embodiment of the present invention.

Referring now to FIG. 1, one embodiment of a memory apparatus according to the present invention is shown. Sixteen eight bit wide, 4 megabit addressable memory devices 112, 115, 118, 121, 124, 127, 130, 133, 153, 156, 159, 162, 165, 168, 171, 174 such as eight bit wide 4 meg RAMs are each used to hold two four bit wide nibbles in each half 110, 111, 113, 114, 116, 117, 119, 120, 122, 123, 125, 126, 128, 129, 131, 132, 151, 152, 154, 155, 157, 158, 160, 161, 163, 164, 166, 167, 169, 170, 172, 173 for a total storage of 128 bits per memory location. Nibbles 110, 113, 116, 119, 122, 125, 128, 131, 151, 154, 157, 160, 163, 166, 169, 172 hold one 64-bit data word 192 per storage location, and nibbles 111, 114, 117, 120, 123, 126, 129, 132, 152, 155, 158, 161, 164, 167, 170, 173 hold a second 64-bit data word 194 per storage location. Each memory device 112, 115, 118, 121, 124, 127, 130, 133, 153, 156, 159, 162, 165, 168, 171, 174 has an address input 196 coupled to an address bus 195. This arrangement allows simultaneous storage and retrieval of two 64-bit data words 192, 194 at each address on the bus 195. In other embodiments, each addressable memory device 112, 115, 118, 121, 124, 127, 130, 133, 153, 156, 159, 162, 165, 168, 171, 174 stores data from data word 192 in groups of bits having a size equal to four or another a multiple of four, for example, eight, twelve or sixteen.

As described below, an error code is generated which detects the complete chip failure of a chip having a width equal to a multiple of the number of bits from a single data word 192 or 194 which are stored on each addressable memory device 112, 115, 118, 121, 124, 127, 130, 133, 153, 156, 159, 162, 165, 168, 171, 174. Thus, in FIG. 1, because each addressable memory device 112, 115, 118, 121, 124, 127, 130, 133, 153, 156, 159, 162, 165, 168, 171, 174 stores four bits from data word 192, an SEC-DED-S4ED code may be used to detect the complete failure of all of the bits of data word 192 stored on one or more of the eight bit wide addressable memory devices 112, 115, 118, 121, 124, 127, 130, 133, 153, 156, 159, 162, 165, 168, 171, 174.

Error code generators 142, 144 generate the error code for each data word for a device size equal to the number of bits used to store a single data word in each device 112, 115, 118, 121, 124, 127, 130, 133, 153, 156, 159, 162, 165, 168, 171, 174. In the embodiment illustrated in FIG. 1, each device 112, 115, 118, 121, 124, 127, 130, 133, 153, 156, 159, 162, 165, 168, 171, 174 stores four bits of each data word, thus an SEC-DED-S4ED code is generated by error code generators 142, 144. An SEC-DED-S4ED code for 64 bits of data $d0-d63$ utilizes eight check bits $c0-c7$. Equations 1 through 8 show the check bit generation operation to generate an SEC-DED-S4ED code for 64 bits of data.

$c0 = d0 \wedge d3 \wedge d5 \wedge d8 \wedge d11 \wedge d12 \wedge d16 \wedge d21 \wedge d25 \wedge$
$d28 \wedge d33 \wedge d35 \wedge d37 \wedge d39 \wedge d40 \wedge d42 \wedge d43 \wedge$
$d44 \wedge d46 \wedge d47 \wedge d49 \wedge d50 \wedge d51 \wedge d52 \wedge d54 \wedge$
$d55 \wedge d57 \wedge d58 \wedge d60 \wedge d61$ (Eq. 1)

$c1 = d1 \wedge d4 \wedge d7 \wedge d9 \wedge d13 \wedge d17 \wedge d20 \wedge d23 \wedge d24 \wedge$
$d27 \wedge d29 \wedge d32 \wedge d34 \wedge d35 \wedge d36 \wedge d38 \wedge d39 \wedge$
$d41 \wedge d43 \wedge d45 \wedge d47 \wedge d49 \wedge d50 \wedge d51 \wedge d52 \wedge$
$d54 \wedge d55 \wedge d56 \wedge d60 \wedge d61$ (Eq. 2)

$c2 = d1 \wedge d2 \wedge d7 \wedge d9 \wedge d10 \wedge d14 \wedge d18 \wedge d23 \wedge d27 \wedge$
$d30 \wedge d33 \wedge d35 \wedge d37 \wedge d39 \wedge d40 \wedge d41 \wedge d42 \wedge$
$d44 \wedge d45 \wedge d46 \wedge d48 \wedge d49 \wedge d51 \wedge d52 \wedge d53 \wedge$
$d54 \wedge d56 \wedge d59 \wedge d62 \wedge d63$ (Eq. 3)

-continued $$c3 = d3 \wedge d5 \wedge d6 \wedge d11 \wedge d15 \wedge d19 \wedge d21 \wedge d22 \wedge d25 \wedge$$
$$d26 \wedge d31 \wedge d32 \wedge d33 \wedge d34 \wedge d36 \wedge d37 \wedge d38 \wedge$$
$$d41 \wedge d43 \wedge d45 \wedge d47 \wedge d48 \wedge d49 \wedge d51 \wedge d52 \wedge$$
$$d53 \wedge d54 \wedge d58 \wedge d62 \wedge d63 \quad \text{(Eq. 4)}$$

$$c4 = d1 \wedge d3 \wedge d5 \wedge d7 \wedge d8 \wedge d10 \wedge d11 \wedge d13 \wedge d14 \wedge$$
$$d15 \wedge d16 \wedge d18 \wedge d19 \wedge d21 \wedge d22 \wedge d24 \wedge d26 \wedge$$
$$d27 \wedge d28 \wedge d29 \wedge d32 \wedge d35 \wedge d37 \wedge d40 \wedge d43 \wedge$$
$$d45 \wedge d48 \wedge d52 \wedge d57 \wedge d60 \quad \text{(Eq. 5)}$$

$$c5 = d0 \wedge d2 \wedge d3 \wedge d4 \wedge d6 \wedge d7 \wedge d9 \wedge d11 \wedge d13 \wedge d14 \wedge$$
$$d15 \wedge d16 \wedge d18 \wedge d19 \wedge d20 \wedge d25 \wedge d27 \wedge d28 \wedge$$
$$d29 \wedge d33 \wedge d36 \wedge d39 \wedge d41 \wedge d44 \wedge d47 \wedge d49 \wedge$$
$$d53 \wedge d56 \wedge d59 \wedge d61 \quad \text{(Eq. 6)}$$

$$c6 = d1 \wedge d3 \wedge d5 \wedge d7 \wedge d8 \wedge d9 \wedge d10 \wedge d12 \wedge d13 \wedge$$
$$d15 \wedge d16 \wedge d17 \wedge d18 \wedge d20 \wedge d23 \wedge d24 \wedge d25 \wedge$$
$$d26 \wedge d30 \wedge d31 \wedge d33 \wedge d34 \wedge d39 \wedge d41 \wedge d42 \wedge$$
$$d47 \wedge d50 \wedge d54 \wedge d59 \wedge d62 \quad \text{(Eq. 7)}$$

$$c7 = d0 \wedge d1 \wedge d2 \wedge d4 \wedge d5 \wedge d6 \wedge d9 \wedge d11 \wedge d12 \wedge$$
$$d13 \wedge d15 \wedge d16 \wedge d17 \wedge d18 \wedge d22 \wedge d25 \wedge d27 \wedge$$
$$d30 \wedge d31 \wedge d35 \wedge d37 \wedge d38 \wedge d43 \wedge d45 \wedge d46 \wedge$$
$$d51 \wedge d55 \wedge d57 \wedge d58 \wedge d63 \quad \text{(Eq. 8)}$$

where $\wedge$ is an Exclusive OR operation.

In one embodiment, two eight bit wide 4 meg RAMs 187, 190 are used to store the SEC-DED-S4ED code for 64 bits of data. In one embodiment, the check bits for the code, also known as the code, are stored in each nibble 185, 186, 188, 189 of memories 187, 190 which provide eight bits of storage and retrieval capacity for the SEC-DED-S4ED code 191, 193 corresponding to data words 192, 194 respectively. Memories 187, 190 have address inputs 196 coupled to the address bus 195 used by memories 112, 115, 118, 121, 124, 127, 130, 133, 153, 156, 159, 162, 165, 168, 171, 174.

Upon retrieval of the data, the data bits d0–d63 and the check bits c0–c7 are used by verifiers 146, 148 to produce eight verification bits s0–s7, generated as described in equations 9 through 16 which will each be zero if there are no errors in the data.

$$s0 = c0 \wedge d0 \wedge d3 \wedge d5 \wedge d8 \wedge d11 \wedge d12 \wedge d16 \wedge d21 \wedge$$
$$d25 \wedge d28 \wedge d33 \wedge d35 \wedge d37 \wedge d39 \wedge d40 \wedge d42 \wedge d43 \wedge$$
$$d44 \wedge d46 \wedge d47 \wedge d49 \wedge d50 \wedge d51 \wedge d52 \wedge d54 \wedge$$
$$d55 \wedge d57 \wedge d58 \wedge d60 \wedge d61 \quad \text{(Eq. 9)}$$

$$s1 = c1 \wedge d1 \wedge d4 \wedge d7 \wedge d9 \wedge d13 \wedge d17 \wedge d20 \wedge d23 \wedge d24 \wedge$$
$$d27 \wedge d29 \wedge d32 \wedge d34 \wedge d35 \wedge d36 \wedge d38 \wedge d39 \wedge$$
$$d41 \wedge d43 \wedge d45 \wedge d47 \wedge d49 \wedge d50 \wedge d51 \wedge d52 \wedge$$
$$d54 \wedge d55 \wedge d56 \wedge d60 \wedge d61 \quad \text{(Eq. 10)}$$

$$s2 = c2 \wedge d1 \wedge d2 \wedge d7 \wedge d9 \wedge d10 \wedge d14 \wedge d18 \wedge d23 \wedge d27 \wedge$$
$$d30 \wedge d33 \wedge d35 \wedge d37 \wedge d39 \wedge d40 \wedge d41 \wedge d42 \wedge$$
$$d44 \wedge d45 \wedge d46 \wedge d48 \wedge d49 \wedge d51 \wedge d52 \wedge d53 \wedge$$
$$d54 \wedge d56 \wedge d59 \wedge d62 \wedge d63 \quad \text{(Eq. 11)}$$

$$s3 = c3 \wedge d3 \wedge d5 \wedge d6 \wedge d11 \wedge d15 \wedge d19 \wedge d21 \wedge d22 \wedge d25 \wedge$$
$$d26 \wedge d31 \wedge d32 \wedge d33 \wedge d34 \wedge d36 \wedge d37 \wedge d38 \wedge$$
$$d41 \wedge d43 \wedge d45 \wedge d47 \wedge d48 \wedge d49 \wedge d51 \wedge d52 \wedge$$
$$d53 \wedge d54 \wedge d58 \wedge d62 \wedge d63 \quad \text{(Eq. 12)}$$

$$s4 = c4 \wedge d1 \wedge d3 \wedge d5 \wedge d7 \wedge d8 \wedge d10 \wedge d11 \wedge d13 \wedge d14 \wedge$$
$$d15 \wedge d16 \wedge d18 \wedge d19 \wedge d21 \wedge d22 \wedge d24 \wedge d26 \wedge$$
$$d27 \wedge d28 \wedge d29 \wedge d32 \wedge d35 \wedge d37 \wedge d40 \wedge d43 \wedge$$
$$d45 \wedge d48 \wedge d52 \wedge d57 \wedge d60 \quad \text{(Eq. 13)}$$

$$s5 = c5 \wedge d0 \wedge d2 \wedge d3 \wedge d4 \wedge d6 \wedge d7 \wedge d9 \wedge d11 \wedge d13 \wedge$$
$$d14 \wedge d15 \wedge d16 \wedge d18 \wedge d19 \wedge d20 \wedge d25 \wedge d27 \wedge$$
$$d28 \wedge d29 \wedge d33 \wedge d36 \wedge d39 \wedge d41 \wedge d44 \wedge d47 \wedge$$
$$d49 \wedge d53 \wedge d56 \wedge d59 \wedge d61 \quad \text{(Eq. 14)}$$

$$s6 = c6 \wedge d1 \wedge d3 \wedge d5 \wedge d7 \wedge d8 \wedge d9 \wedge d10 \wedge d12 \wedge d13 \wedge$$
$$d15 \wedge d16 \wedge d17 \wedge d18 \wedge d20 \wedge d23 \wedge d24 \wedge d25 \wedge$$
$$d26 \wedge d30 \wedge d31 \wedge d33 \wedge d34 \wedge d39 \wedge d41 \wedge d42 \wedge$$
$$d47 \wedge d50 \wedge d54 \wedge d59 \wedge d62 \quad \text{(Eq. 15)}$$

-continued $$s7 = c7 \wedge d0 \wedge d1 \wedge d2 \wedge d4 \wedge d5 \wedge d6 \wedge d9 \wedge d11 \wedge d12 \wedge$$
$$d13 \wedge d15 \wedge d16 \wedge d17 \wedge d18 \wedge d22 \wedge d25 \wedge d27 \wedge$$
$$d30 \wedge d31 \wedge d35 \wedge d37 \wedge d38 \wedge d43 \wedge d45 \wedge d46 \wedge$$
$$d51 \wedge d55 \wedge d57 \wedge d58 \wedge d63 \quad \text{(Eq. 16)}$$

where $\wedge$ indicates an Exclusive-OR operation. Error detection and correction codes are described in W. W. Peterson and E. J. Weldon, Jr., *Error Correcting Codes*, (2d ed. M.I.T. Press 1984). Verifiers 146, 148 may produce an output 147, 149 to indicate an error or to correct errors. In one embodiment output 147, 149 presents the entire corrected data word from input/output 192, 194.

Figure 2:
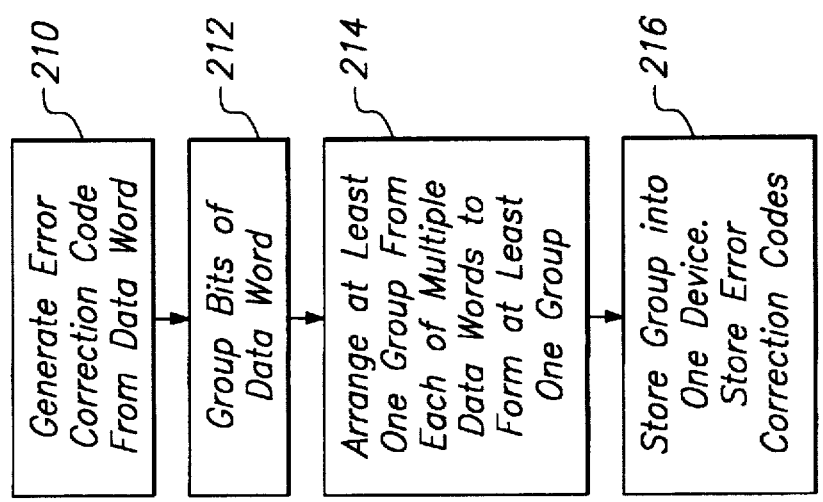
FIG. 2 is a flow chart illustrating a method of storing one or more data words and the error code associated with each data word according to one embodiment of the present invention.

Referring now to FIG. 2, one embodiment of a method of storing a data word and an error code into an addressable memory according to the present invention is shown. An error code which detects the complete failure of an addressable memory device smaller than the memory device onto which the data is to be stored is generated from the data word 210. In one embodiment, the addressable memory devices have a width of eight bits and the error code generated is SEC-DED-S4ED as described above. In another embodiment, the addressable memory devices have a width equal to a multiple of four, and the error code generated is SEC-DED-S4ED as described above.

In one embodiment, each of the bits in the data word are arranged into groups of bits 212 and stored in an addressable memory device 216. Steps 212 and 210 may be performed in any order. In one embodiment, steps 210 and 212 are performed for two or more data words, with the groups further arranged to combine at least one group from each of the two or more data words into a single group 214 which is then stored 216 in a single addressable memory device. It is not necessary to combine the groups from various data words 214, although doing so may make more efficient use of the addressable storage device. Each of the error codes generated may also be stored 216. Each of the error codes may be stored by itself in a single device, or the bits of the two error codes may be arranged into groups and at least one group from each error code may then be stored in a single addressable memory device.

Figure 3:
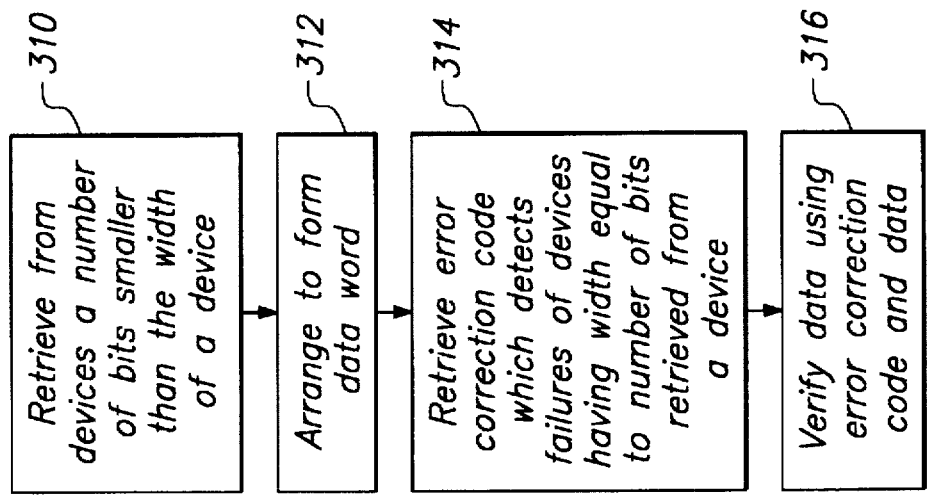
FIG. 3 is a flow chart illustrating a method of retrieving one or more data words and the error code associated with each data word according to one embodiment of the present invention.

Referring now to FIG. 3, one embodiment of a method for reading two data words from an addressable memory device according to the present invention is shown. A first number of bits smaller than the width of addressable memory devices are retrieved from each of several memory devices and arranged to form a first data word 310, 312. A first error code is retrieved which detects the failure of a device having a width equal to the first number is read and used with the first data word to determine if one or more of the memory devices has failed 314, 316. Steps 310, 312, 314 and 316 may be performed on additional data words using the same addressable location in the memory device. The use of error codes that detect the failure of addressable memory devices with widths smaller than the actual memory devices allows the use of more compact error codes.

What is claimed is:

1. An apparatus for storing a data word comprising bits, comprising:

a first set of apparatus input/outputs for accepting the data word for storage and retrieving a first set of bits of the stored data word;

a first set of at least one addressable memory device coupled to a first number of the first set of the apparatus input/outputs, and having a width of a second number of bits for storing a third number of bits of the data word, the third number being less than the second number;

a second set of apparatus input/outputs;

wherein at least one of the addressable memory devices in the first set of apparatus input/outputs are additionally coupled to a fourth number of the apparatus input/outputs in the second set of apparatus input/outputs;

the addressable memory devices in the first set are additionally for storing a fifth number of bits of a second data word, the fifth number being less than the second number; and an error correction code generator for generating an error correction code of the data word capable of detecting device failures for a second set of devices having a width of the third number of bits.

2. The apparatus of claim 1 additionally comprising a third set of at least one storage device for storing the error correction code.

3. The apparatus of claim 2 wherein the storage device has a width equal to a fourth number of bits in an error correction code which detects failures of a fourth set of devices no larger than the devices in the third set.

4. The apparatus of claim 3 wherein the second number of bits is equal to eight and the third number is four.

5. The apparatus of claim 4 wherein the error correction code is an SEC-DED-S4ED code.

6. The apparatus of claim 1 wherein the third number is equal to the fifth number.

7. The apparatus of claim 6 wherein the third and fifth numbers are equal to four.

8. The apparatus of claim 6 wherein the third and fifth numbers are equal to eight.

9. The apparatus of claim 6 wherein the third and fifth numbers are equal to sixteen.

10. A method of storing at least one data word comprising bits into a plurality of addressable memory devices having a width of a first number of bits, and preparing for the detection of errors in a set of at least one bit in the data word, comprising the steps of:

arranging a first data word into a plurality of groups of a second number of bits, the second number being less than the first number;

storing at least one of the groups of data word bits from the first data word into each of a plurality of the addressable memory devices; and generating a first error correction code from the first data word capable of detecting a device failure of a first device having a bit width no greater than the second number of bits.

11. The method of claim 10 comprising the additional step of storing the error correction code generated.

12. The method of claim 10 wherein the first number is equal to twice the second number.

13. The method of claim 10 additionally comprising the steps of:

arranging a second data word into a plurality of groups of a third number of bits, the third number less than the first number;

storing at least one of the groups of data word bits from the second data word into at least one of the plurality of the addressable memory devices; and generating a second error correction code from the second data word capable of detecting a device failure of a second device having a width no greater than the third number of bits.

14. The method of claim 10 wherein the second number equals the first number.

15. A method of retrieving at least one data word comprising bits from a first set of a plurality of addressable storage devices, at least one of the addressable storage devices in the first set having a bit width equal to a first number of bits, and preparing the data retrieved for verification, comprising the steps of:

reading one first set of a second number of bits from each of the plurality of addressable storage devices in the first set, the second number being less than the first number;

reading a first error correction code capable of detecting the failure of a device having a width no greater than the second number from a second set of at least one addressable storage device;

arranging the bits in the first set read into a first data word;

reading one second set of a third number of bits from each of the plurality of addressable storage devices in the first set;

arranging the bits in the second set into a second data word; and reading a second error correction code from the second set of addressable storage devices.

16. The method of claim 15 wherein the first number is equal to twice the second number.

17. The method of claim 15 wherein the second number equals the third number.

18. The method of claim 17 wherein the sum of the second and third numbers equal the first number.

* * * * *